(12) United States Patent
Radbill

(10) Patent No.: US 12,376,952 B1
(45) Date of Patent: Aug. 5, 2025

(54) TEETH CLEANING DOG CHEW TOY

(71) Applicant: Erik Radbill, Eversham, NJ (US)

(72) Inventor: Erik Radbill, Eversham, NJ (US)

( * ) Notice: Subject to any disclaimer, the term of this patent is extended or adjusted under 35 U.S.C. 154(b) by 352 days.

(21) Appl. No.: 18/109,463

(22) Filed: Feb. 14, 2023

(51) Int. Cl.
    *A61D 5/00*     (2006.01)
    *A01K 15/02*     (2006.01)

(52) U.S. Cl.
    CPC .............. *A61D 5/00* (2013.01); *A01K 15/026* (2013.01); *A46B 2200/1086* (2013.01)

(58) Field of Classification Search
    CPC ..................... A01K 15/026; A61D 5/00; A46B 2200/1086; A46B 2200/1093; A46B 2200/10; A46B 9/08
    See application file for complete search history.

(56) References Cited

U.S. PATENT DOCUMENTS

| | | | |
|---|---|---|---|
| 4,924,811 A | 5/1990 | Axelrod | |
| 9,744,014 B2 | 8/2017 | Smith | |
| 10,206,373 B1 | 2/2019 | Fincher | |
| 2014/0245967 A1* | 9/2014 | Glaser | A01K 15/026 119/709 |
| 2015/0083052 A1 | 3/2015 | Glaser | |
| 2015/0223594 A1* | 8/2015 | Ohanessian | A46B 9/045 15/104.94 |
| 2017/0290291 A1* | 10/2017 | Moeller | A46D 1/0253 |
| 2020/0281160 A1 | 9/2020 | Crane | |
| 2021/0204518 A1 | 7/2021 | Crane | |

FOREIGN PATENT DOCUMENTS

CA     2813562     4/2012

* cited by examiner

*Primary Examiner* — Andrew A Horton
(74) *Attorney, Agent, or Firm* — Kyle A. Fletcher, Esq.

(57) ABSTRACT

The teeth cleaning dog chew toy is adapted for use with the dentition of a companion animal. The teeth cleaning dog chew toy cleans the dentition of the companion animal. The teeth cleaning dog chew toy includes a working element structure and a handle structure. The working element structure attaches to the handle structure. The working element structure joins to the handle structure to form a composite prism structure. The handle structure forms a grip used to carry and manipulate the teeth cleaning dog chew toy. The working element structure cleans and massages the dentition of the companion animal.

13 Claims, 5 Drawing Sheets

TEETH CLEANING DOG CHEW TOY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments for treating animal teeth. (A61D5/00)

Summary of Invention

The teeth cleaning dog chew toy is a therapeutic device. The teeth cleaning dog chew toy is adapted for use with the dentition of a companion animal. The teeth cleaning dog chew toy cleans the dentition of the companion animal. The teeth cleaning dog chew toy comprises a working element structure and a handle structure. The working element structure attaches to the handle structure. The working element structure joins to the handle structure to form a composite prism structure. The handle structure forms a grip used to carry and manipulate the teeth cleaning dog chew toy. The working element structure cleans and massages the dentition of the companion animal.

These together with additional objects, features and advantages of the teeth cleaning dog chew toy will be readily apparent to those of ordinary skill in the art upon reading the following detailed description of the presently preferred, but nonetheless illustrative, embodiments when taken in conjunction with the accompanying drawings.

In this respect, before explaining the current embodiments of the teeth cleaning dog chew toy in detail, it is to be understood that the teeth cleaning dog chew toy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the teeth cleaning dog chew toy.

It is therefore important that the claims be regarded as including such equivalent construction insofar as they do not depart from the spirit and scope of the teeth cleaning dog chew toy. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
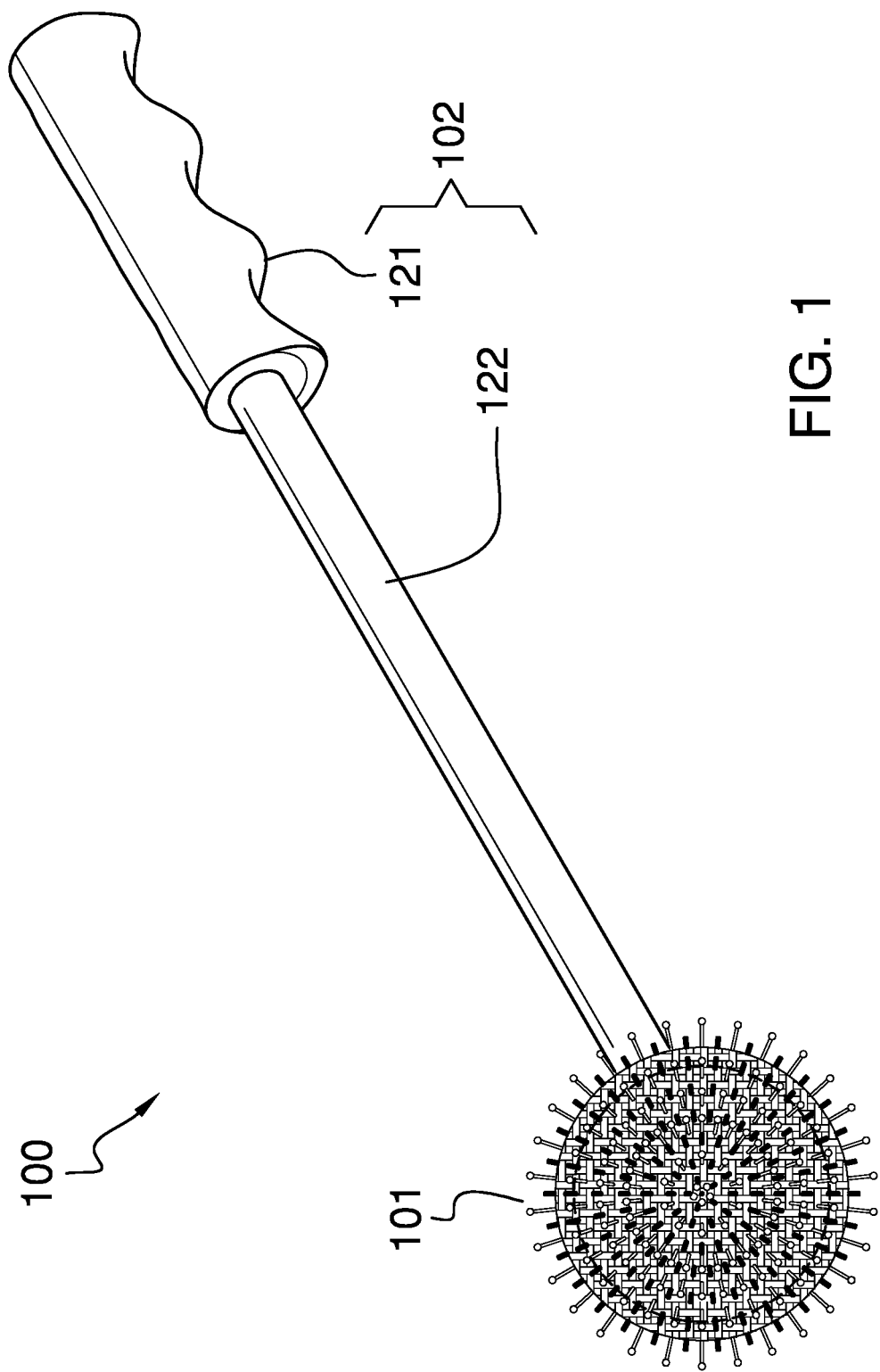
FIG. 1 is a perspective view of an embodiment of the disclosure.
Figure 2:
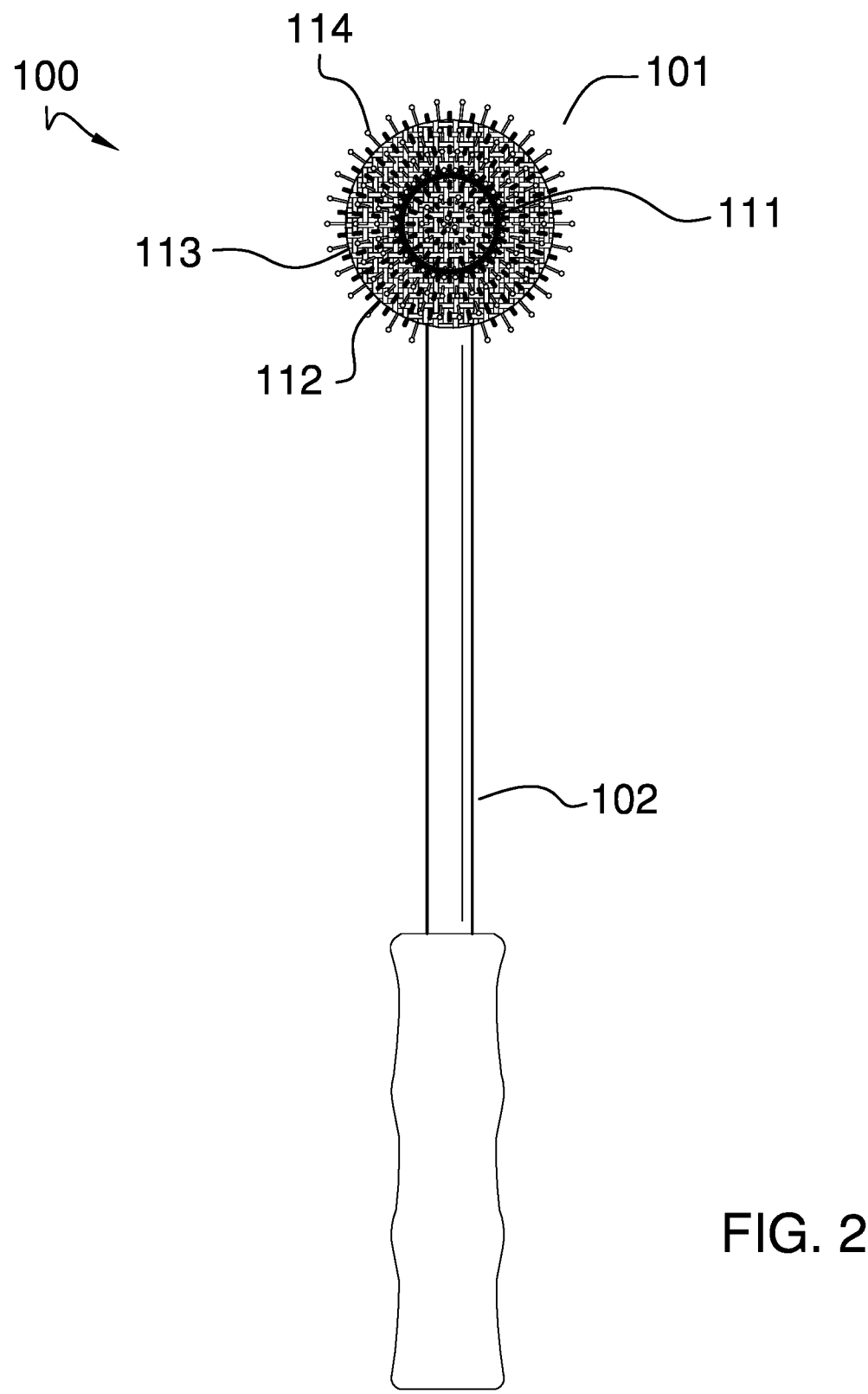
FIG. 2 is a front view of an embodiment of the disclosure.
Figure 3:
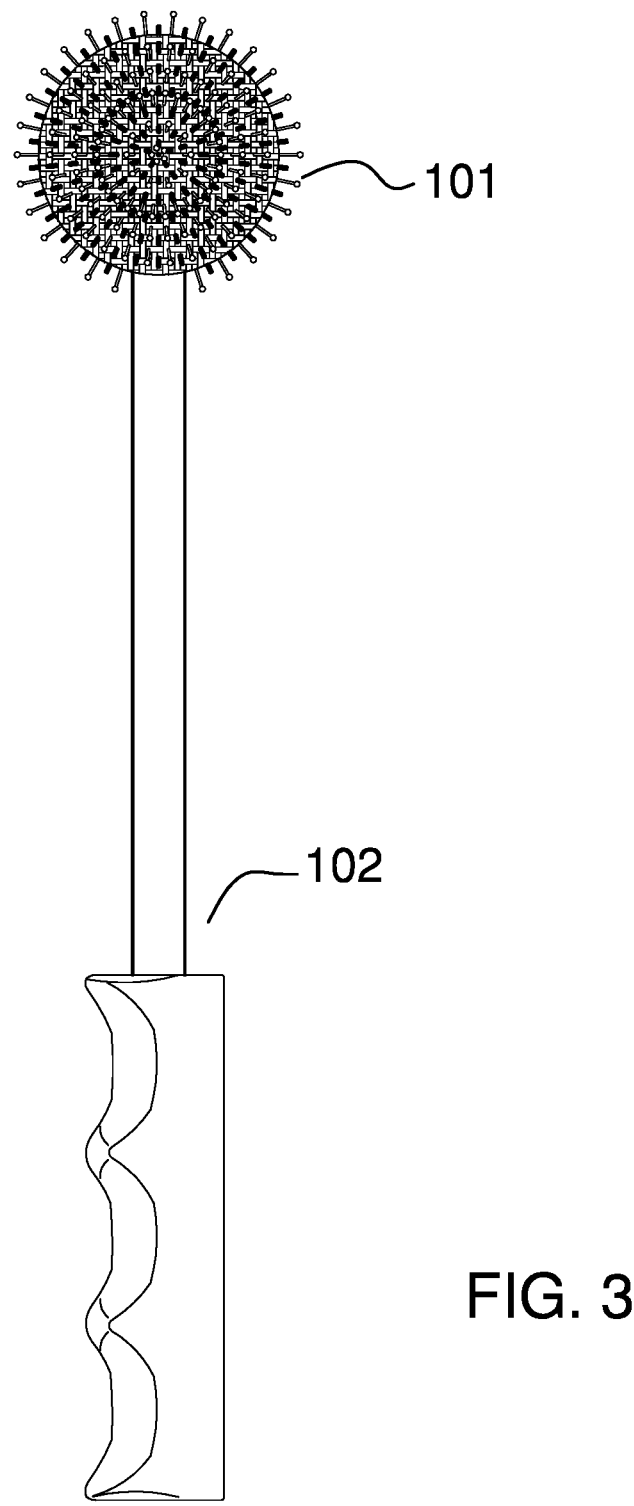
FIG. 3 is a side view of an embodiment of the disclosure.
Figure 4:
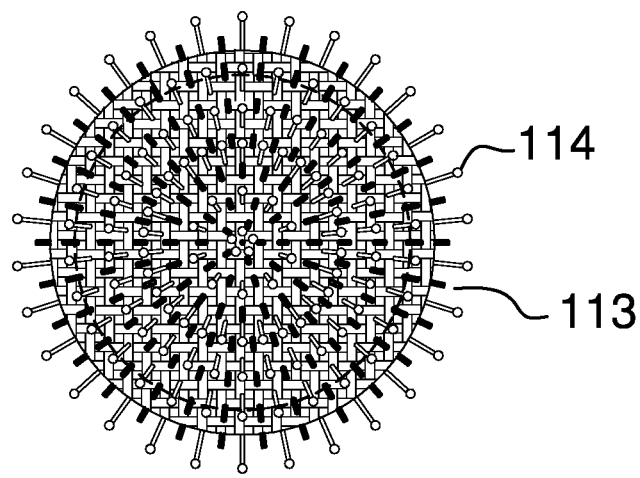
FIG. 4 is a top view of an embodiment of the disclosure.
Figure 5:
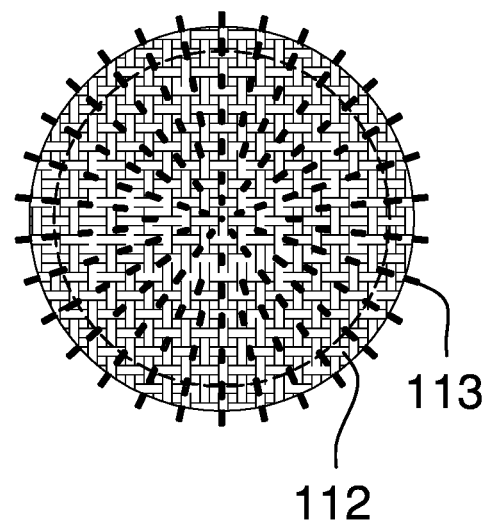
FIG. 5 is a detail view of an embodiment of the disclosure.
Figure 6:
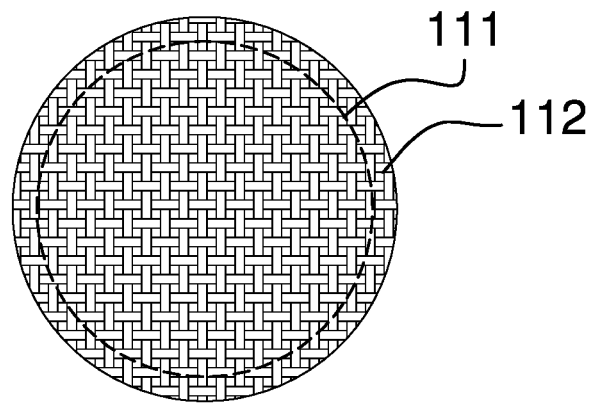
FIG. 6 is a detail view of an embodiment of the disclosure.
Figure 7:
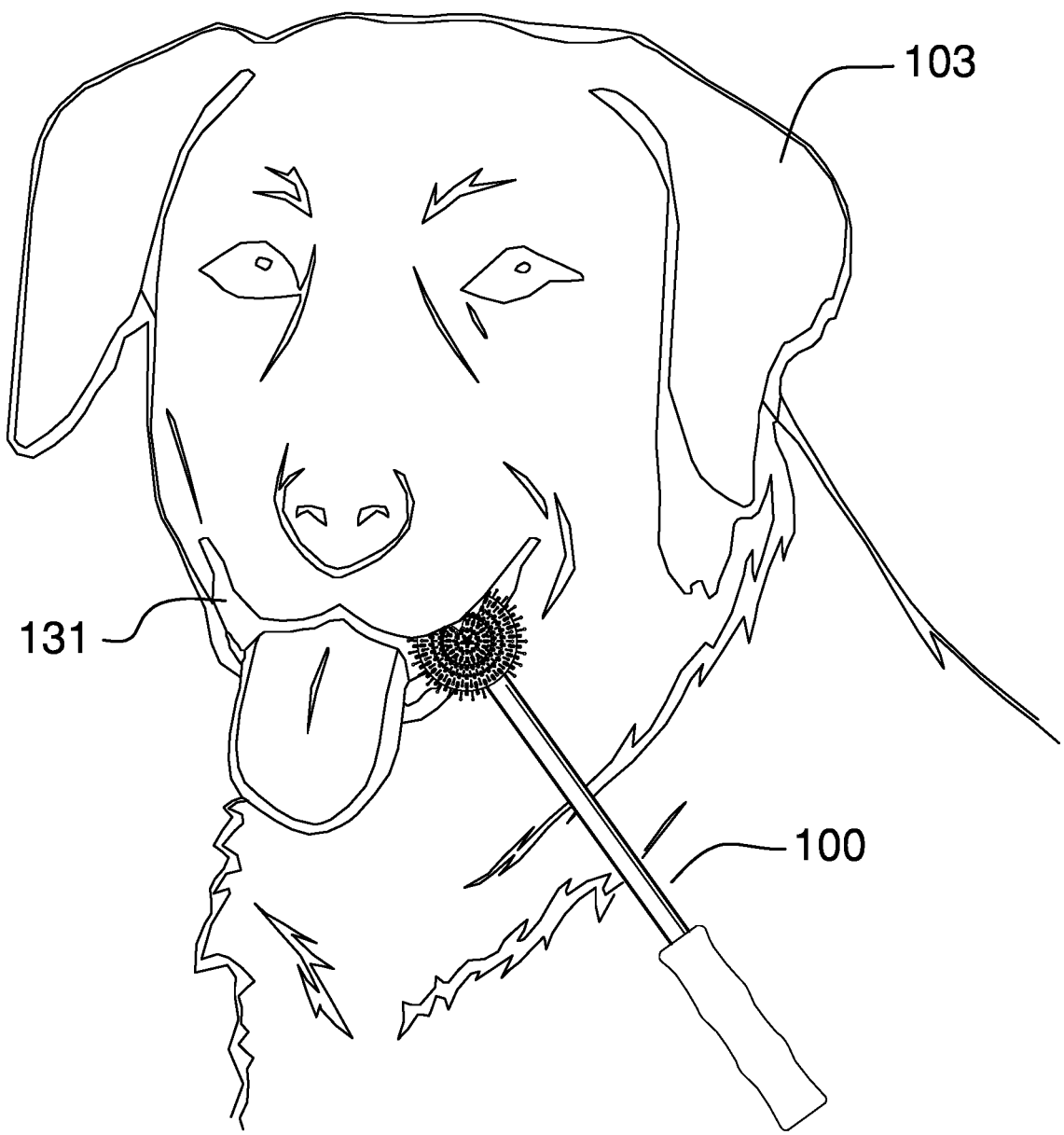
FIG. 7 is an in-use view of an embodiment of the disclosure.

Detailed reference will now be made to one or more potential embodiments of the disclosure, which are illustrated in FIGS. 1 through 7.

The teeth cleaning dog chew toy 100 (hereinafter invention) is a therapeutic device. The invention 100 is a tool. The invention 100 is adapted for use with the dentition 131 of a companion animal 103. The invention 100 cleans the dentition 131 of the companion animal 103. The invention 100 comprises a working element structure 101 and a handle structure 102. The working element structure 101 attaches to the handle structure 102. The working element structure 101 joins to the handle structure 102 to form a composite prism structure. The handle structure 102 forms a grip used to carry and manipulate the invention 100. The working element structure 101 cleans and massages the dentition 131 of the companion animal 103.

The companion animal 103 is defined elsewhere in this disclosure. The dentition 131 is defined elsewhere in this disclosure.

The working element structure 101 forms the working element of the tool formed by the invention 100. The working element structure 101 cleans the dentition 131 of the companion animal 103. The working element structure 101 massages the dentition 131. The working element structure 101 is a composite structure. The working element structure 101 is a layered structure. The working element structure 101 is a spherical structure. The working element structure 101 attaches to the handle structure to form a composite prism structure. The composite layers of the working element structure 101 perform different cleaning activities on the dentition 131 of the companion animal 103. The working element structure 101 comprises a core sphere structure 111, a tight brush structure 112, a scrub brush structure 113, and a massage brush structure 114.

The core sphere structure 111 forms the innermost layer of the composite structure of the working element structure 101. The core sphere structure 111 has a spherical structure. The core sphere structure 111 is a semi-rigid structure. The core sphere structure 111 is an elastic structure. The tight brush structure 112 physically attaches to the core sphere structure 111. The scrub brush structure 113 physically attaches to the core sphere structure 111. The massage brush structure 114 physically attaches to the core sphere structure 111.

The tight brush structure 112 forms the structure of the working element structure 101 that scrubs the dentition 131 of the companion animal 103. The tight brush structure 112 is a first brush that is formed on the exterior surface of the core sphere structure 111. Each bristle of the tight brush structure mounts on the exterior surface of the core sphere structure 111. The bristles of the tight brush structure 112 are evenly distributed over the exterior surface of the core sphere structure 111. Each bristle of the tight brush structure 112 mount on the core sphere structure 111 such that the center axis of each bristle projects perpendicularly away from the exterior surface of the core sphere structure 111.

Each bristle of the tight brush structure 112 is identical. Each bristle of the tight brush structure 112 is a prism shaped structure. Each bristle of the tight brush structure 112 is a semi-rigid structure. Each bristle of the tight brush structure is an elastic structure. Each bristle of the tight brush structure 112 is further defined with a first modulus. The center axis of the tight brush structure 112 is further defined with a first span of length.

The scrub brush structure 113 forms the structure of the working element structure 101 that removes the detritus from the dentition 131 of the companion animal 103. The scrub brush structure 113 is a second brush that is formed on the exterior surface of the core sphere structure 111. Each bristle of the scrub brush structure 113 mounts on the exterior surface of the core sphere structure 111. The bristles of the scrub brush structure 113 are evenly distributed over the exterior surface of the core sphere structure 111. The bristles of the scrub brush structure 113 are evenly distributed between the bristles of the tight brush structure 112. Each bristle of the scrub brush structure 113 mount on the core sphere structure 111 such that the center axis of each bristle projects perpendicularly away from the exterior surface of the core sphere structure 111.

Each bristle of the scrub brush structure 113 is identical. Each bristle of the scrub brush structure 113 is a prism shaped structure. Each bristle of the scrub brush structure 113 is a semi-rigid structure. Each bristle of the scrub brush structure is an elastic structure. Each bristle of the scrub brush structure 113 is further defined with a second modulus. The center axis of the scrub brush structure 113 is further defined with a second span of length. The magnitude of the second modulus of the bristles of the scrub brush structure 113 is greater than the magnitude of the first modulus of any bristle selected from the tight brush structure 112. The second span of the length of the center axis of each bristle of the scrub brush structure 113 is greater than the first span of the length of any selected bristle of the tight brush structure 112.

The massage brush structure 114 forms the structure of the working element structure 101 that massages the dentition 131 of the companion animal 103. The massage brush structure 114 is a third brush that is formed on the exterior surface of the core sphere structure 111. Each bristle of the massage brush structure 114 mounts on the exterior surface of the core sphere structure 111. The bristles of the massage brush structure 114 are evenly distributed over the exterior surface of the core sphere structure 111. The bristles of the massage brush structure 114 are evenly distributed between the bristles of the tight brush structure 112. The bristles of the massage brush structure 114 are evenly distributed between the bristles of the scrub brush structure 113. Each bristle of the massage brush structure 114 mount on the core sphere structure 111 such that the center axis of each bristle projects perpendicularly away from the exterior surface of the core sphere structure 111.

Each bristle of the massage brush structure 114 is identical. Each bristle of the massage brush structure 114 is a prism shaped structure. Each bristle of the massage brush structure 114 is a semi-rigid structure. Each bristle of the massage brush structure 114 is an elastic structure. Each bristle of the massage brush structure 114 is further defined with a third modulus. The center axis of the massage brush structure 114 is further defined with a third span of length.

The magnitude of the third modulus of the bristles of the massage brush structure 114 is lesser than the magnitude of the first modulus of any bristle selected from the tight brush structure 112. The magnitude of the third modulus of the bristles of the massage brush structure 114 is greater than the magnitude of the second modulus of any bristle selected from the scrub brush structure 113. The third span of the length of the center axis of each bristle of the massage brush structure 114 is greater than the first span of the length of any selected bristle of the tight brush structure 112. The third span of the length of the center axis of each bristle of the massage brush structure is greater than the second span of the length of any selected bristle of the scrub brush structure 113.

The handle structure 102 is a prism structure. The handle structure 102 is formed with a composite prism structure. The handle structure 102 forms a reach between an individual using the invention 100 and the dentition 131 of the companion animal when the working element structure 101 is in use. The handle structure 102 comprises a grip structure 121 and an extension structure 122.

The grip structure 121 forms the structure of the handle structure 102 that is held by an individual using the invention 100. The grip structure 121 is a prism shaped structure. The grip structure 121 attaches to the extension structure 122 to form a composite prism structure. The grip structure 121 attaches to the congruent end of the extension structure 122 that is distal from the working element structure 101.

The extension structure 122 forms a reach between the working element structure 101 and the grip structure 121. The extension structure 122 attaches the working element structure to the grip structure 121. The extension structure 122 is a prism shaped structure. The extension structure 122 is a rigid structure. The extension structure 122 attaches to the core sphere structure 111 of the working element structure 101 to form a composite prism structure. The core sphere structure 111 attaches to a congruent end of the extension structure 122. The extension structure 122 attaches to the grip structure 121 to form a composite prism structure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Animal: As used in this disclosure, an animal is a biological organism that consumes organic material as its primary energy source for metabolism, requires oxygen for its primary metabolic processes, reproduces sexually, and forms tissues. Always use metabolism and tissue Bristle: As used in this disclosure, a bristle is a short coarse stiff hair or hair like object.

Brush: As used in this disclosure, a brush is a tool comprising a plurality of bristles set into a handle or a base that is used for grooming, sweeping, smoothing, cleaning, scrubbing, or painting.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Companion Animal: As used in this disclosure, a companion animal is a domesticated animal that is maintained primarily for companionship. A companion animal is often referred to as a pet.

Composite: As used in this disclosure, composite refers to a two-dimensional or three-dimensional structure that is formed from two or more distinctly identifiable sub-structures.

Composite Prism: As used in this disclosure, a composite prism refers to a structure that is formed from a plurality of structures selected from the group consisting of a prism structure, a pyramid structure, and a spherical structure. The plurality of selected structures may or may not be truncated. The plurality of prism structures are joined together such that the center axes (or spherical diameter) of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Dentition: As used in this disclosure, a dentition refers to a set of teeth and a set of descriptive characteristics of the set of teeth especially with regard to their number, kind, arrangement, and condition.

Detritus: As used in this disclosure, detritus refers to plaque, calculus, and stains that accrete on a tooth.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Flexible: As used in this disclosure, flexible refers to an object or material that will deform when a force is applied to it but that will not necessarily return to its original shape when the deforming force is removed.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term roughly geometrically similar is meant that the primary shapes of two objects are geometrically similar except that there are functional items (such as fastening devices) associated with the primary shape may not maintain the ratio for geometric similarity.

Grip: As used in this disclosure, a grip is an accommodation formed on or within an object that allows the object to be grasped or manipulated by a hand.

Hand Tool: As used in this disclosure, a hand tool refers to a tool that is small and light enough to allow a person to hold the tool during use.

Handle: As used in this disclosure, a handle is an object by which a tool, object, or door is held or manipulated with the hand.

Inert: As used in this disclosure, inert is an adjective that is applied to an object, system, or chemical reaction. Inert means that the object, system, or chemical reaction is incapable of internal motion, internal activity or is otherwise unreactive.

Inert Structure: As used in this disclosure, an inert structure is a physical structure that has no moving parts. An inert structure can be a component in a larger, moving structure.

Inelastic Nature: As used in this disclosure, an inelastic nature refers to a flexible structure that maintains its new shape after the flexible structure has been deformed.

Interior: As used in this disclosure, the interior is used as a relational term that implies that an object is contained within the boundary of a structure or a space.

Kneading: As used in this disclosure, to knead refers to the folding, pressing a stretching of a collection of materials for the purpose of forming a uniform mass. The term kneading may further refer to a motion similar to the kneading motion that is used during massage activities.

Massage: As used in this disclosure, a massage is a therapeutic process wherein the muscles of the body are kneaded for the purpose of aiding circulation and relaxing the muscles.

Metabolism: As used in this disclosure, metabolism refers to the chemical processes that occur within a living cell.

Modulus: As used in this disclosure, the modulus of an elastomeric structure is a function that describes the resistance to the deformation of an elastomeric structure as a function of the force applied to the elastomeric structure. When comparing modulus, a larger modulus is taken to imply a greater force is required to achieve the same deformation.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Patient: As used in this disclosure, a patient is a person who is designated to receive a medical treatment, therapy, or service. The term patient may be extended to an animal when used within the context of the animal receiving veterinary treatment or services.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force.

Rotation: As used in this disclosure, rotation refers to the cyclic movement of an object around a fixed point or fixed axis. The verb of rotation is to rotate.

Rub: As used in this disclosure, to rub is a verb that means to slide a first object against a second object such that friction is generated between the two objects.

Scrub: As used in this disclosure, the verb to scrub means to clean the surface of the object through the use of friction.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sphere: As used in this disclosure, a sphere refers to a structure wherein every point of the surface of the structure is equidistant from a center point. A circle refers to the two dimensional structure that that is projected onto the bifurcating plane of a spherical section by the surface of the sphere. All the points of the circle are equidistant from a center point that is found by the perpendicular projection of the center of the sphere on the bifurcating plane.

Therapeutic: As used in this disclosure, therapeutic is an adjective that refers to a medical, ameliorative, or hygienic substance, process, procedure, or device.

Tissue: As used in this disclosure, a tissue refers to a structure within a biological entity, commonly an animal. The tissue is an aggregation of specialized cells that performs a specific function within the biological entity. An organ is formed from a plurality of tissues. The tissues contained in the plurality of tissues of an organ often perform different functions.

Tool: As used in this disclosure, a tool is a device, an apparatus, or an instrument that is used to carry out an activity, operation, or procedure. A tool generally comprises a working element and a handle. The handle of a tool that forms a sub-component of a larger structure is referred to as a mount.

Toothbrush: As used in this disclosure, a toothbrush is a brush that is used to clean the teeth of a patient.

Truncated: As used in this disclosure, a geometric object is truncated when an apex, vertex, or end is cut off by a line or plane.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A teeth cleaning dog chew toy comprising
a working element structure and a handle structure;
wherein the working element structure attaches to the handle structure;
wherein the teeth cleaning dog chew toy is adapted for use with the dentition of a companion animal;
wherein the teeth cleaning dog chew toy cleans the dentition of the companion animal;
wherein the working element structure comprises a core sphere structure, a tight brush structure, a scrub brush structure, and a massage brush structure;
wherein the core sphere structure forms the innermost layer of the working element structure;
wherein the core sphere structure has a spherical structure;
wherein the core sphere structure is a semi-rigid structure;
wherein the core sphere structure is an elastic structure.

2. The teeth cleaning dog chew toy according to claim 1
wherein the teeth cleaning dog chew toy is a therapeutic device;
wherein the teeth cleaning dog chew toy is a tool.

3. The teeth cleaning dog chew toy according to claim 2
wherein the working element structure joins to the handle structure to form a first composite structure;
wherein the handle structure forms a grip used to carry and manipulate the teeth cleaning dog chew toy;
wherein the working element structure cleans and massages the dentition of the companion animal.

4. The teeth cleaning dog chew toy according to claim 3
wherein the working element structure forms the working element of the tool formed by the teeth cleaning dog chew toy;
wherein the working element structure is a layered structure;
wherein the working element structure is a spherical structure;
wherein composite layers of the working element structure perform different cleaning activities on the dentition of the companion animal.

5. The teeth cleaning dog chew toy according to claim 4
wherein the handle structure is formed with a second composite structure;
wherein the handle structure forms a reach between an individual using the teeth cleaning dog chew toy and the dentition of the companion animal when the working element structure is in use.

6. The teeth cleaning dog chew toy according to claim 5
wherein the tight brush structure physically attaches to the core sphere structure;
wherein the scrub brush structure physically attaches to the core sphere structure;
wherein the massage brush structure physically attaches to the core sphere structure.

7. The teeth cleaning dog chew toy according to claim 6
wherein the tight brush structure forms the structure of the working element structure that scrubs the dentition of the companion animal;
wherein the tight brush structure is a first brush that is formed on the exterior surface of the core sphere structure;
wherein each bristle of the tight brush structure mounts on the exterior surface of the core sphere structure;
wherein the bristles of the tight brush structure are evenly distributed over the exterior surface of the core sphere structure;
wherein each bristle of the tight brush structure mounts on the core sphere structure such that a center axis of each bristle projects perpendicularly away from the exterior surface of the core sphere structure.

8. The teeth cleaning dog chew toy according to claim 7
wherein the scrub brush structure forms the structure of the working element structure that removes the detritus from the dentition of the companion animal;
wherein the scrub brush structure is a second brush that is formed on the exterior surface of the core sphere structure;
wherein each bristle of the scrub brush structure mounts on the exterior surface of the core sphere structure;
wherein the bristles of the scrub brush structure are evenly distributed over the exterior surface of the core sphere structure;
wherein the bristles of the scrub brush structure are evenly distributed between the bristles of the tight brush structure;
wherein each bristle of the scrub brush structure mounts on the core sphere structure such that the center axis of each bristle projects perpendicularly away from the exterior surface of the core sphere structure.

9. The teeth cleaning dog chew toy according to claim 8
wherein the massage brush structure forms the structure of the working element structure that massages the dentition of the companion animal;
wherein the massage brush structure is a third brush that is formed on the exterior surface of the core sphere structure;
wherein each bristle of the massage brush structure mounts on the exterior surface of the core sphere structure;
wherein the bristles of the massage brush structure are evenly distributed over the exterior surface of the core sphere structure;
wherein the bristles of the massage brush structure are evenly distributed between the bristles of the tight brush structure;

wherein the bristles of the massage brush structure are evenly distributed between the bristles of the scrub brush structure;

wherein each bristle of the massage brush structure mounts on the core sphere structure such that the center axis of each bristle projects perpendicularly away from the exterior surface of the core sphere structure.

10. The teeth cleaning dog chew toy according to claim 9 wherein each bristle of the tight brush structure is identical;

wherein each bristle of the tight brush structure is a semi-rigid structure;

wherein each bristle of the tight brush structure is an elastic structure;

wherein each bristle of the tight brush structure is further defined with a first modulus;

wherein a center axis of the tight brush structure is further defined with a first span of length.

11. The teeth cleaning dog chew toy according to claim 10 wherein each bristle of the scrub brush structure is identical;

wherein each bristle of the scrub brush structure is a semi-rigid structure;

wherein each bristle of the scrub brush structure is an elastic structure;

wherein each bristle of the scrub brush structure is further defined with a second modulus;

wherein a center axis of the scrub brush structure is further defined with a second span of length;

wherein the magnitude of the second modulus of the bristles of the scrub brush structure is greater than the magnitude of the first modulus of any bristle selected from the tight brush structure;

wherein the second span of the length of a center axis of each bristle of the scrub brush structure is greater than the first span of the length of any selected bristle of the tight brush structure.

12. The teeth cleaning dog chew toy according to claim 11 wherein each bristle of the massage brush structure is identical;

wherein each bristle of the massage brush structure is a semi-rigid structure;

wherein each bristle of the massage brush structure is an elastic structure;

wherein each bristle of the massage brush structure is further defined with a third modulus;

wherein a center axis of the massage brush structure is further defined with a third span of length;

wherein the magnitude of the third modulus of the bristles of the massage brush structure is lesser than the magnitude of the first modulus of any bristle selected from the tight brush structure;

wherein the magnitude of the third modulus of the bristles of the massage brush structure is greater than the magnitude of the second modulus of any bristle selected from the scrub brush structure;

wherein the third span of the length of a center axis of each bristle of the massage brush structure is greater than the first span of the length of any selected bristle of the tight brush structure;

wherein the third span of the length of the center axis of each bristle of the massage brush structure is greater than the second span of the length of any selected bristle of the scrub brush structure.

13. The teeth cleaning dog chew toy according to claim 12 wherein the handle structure comprises a grip structure and an extension structure;

wherein the grip structure forms the structure of the handle structure that is held by an individual using the teeth cleaning dog chew toy;

wherein the grip structure attaches to the extension structure to form the second composite structure;

wherein the grip structure attaches to the congruent end of the extension structure that is distal from the working element structure;

wherein the extension structure forms a reach between the working element structure and the grip structure;

wherein the extension structure attaches the working element structure to the grip structure;

wherein the extension structure is a rigid structure;

wherein the core sphere structure attaches to a congruent end of the extension structure.

\* \* \* \* \*